United States Patent [19]
Patrick et al.

[11] Patent Number: 5,187,046
[45] Date of Patent: Feb. 16, 1993

[54] ARC-GRAINED LITHOPLATE

[75] Inventors: Edward P. Patrick, Murrysville; A. Victor Pajerski, New Kensington, both of Pa.

[73] Assignee: Aluminum Company of America, Pittsburgh, Pa.

[21] Appl. No.: 670,576

[22] Filed: Mar. 18, 1991

[51] Int. Cl.⁵ ............................................. G03C 1/492
[52] U.S. Cl. .................................. 430/278; 430/302; 428/550; 428/609; 428/632; 304/129.75; 304/129.8; 101/459; 101/463.1
[58] Field of Search ............... 430/278, 302; 428/632, 428/609, 550; 204/33, 129.75, 129.8; 156/665; 101/459, 463.1

[56]     References Cited
U.S. PATENT DOCUMENTS

| | | | |
|---|---|---|---|
| 3,902,976 | 9/1975 | Walls | 430/278 |
| 4,021,592 | 5/1977 | Formson | 430/278 |
| 4,211,619 | 7/1980 | Usbeck | 430/278 |
| 4,301,229 | 11/1981 | Sakaki et al. | 430/278 |
| 4,324,841 | 4/1982 | Huang | 430/278 |
| 4,452,674 | 6/1984 | Gillich | 430/278 |
| 4,476,006 | 10/1984 | Ohba et al. | 430/278 |
| 4,524,125 | 6/1985 | Huang | 430/278 |
| 4,555,475 | 11/1988 | Gamson et al. | 430/278 |
| 4,578,342 | 3/1986 | Sekiya | 430/278 |
| 4,633,054 | 12/1986 | Patrick et al. | 219/118 |
| 4,833,065 | 5/1989 | Nakanishi et al. | 430/278 |
| 4,902,353 | 2/1990 | Rooy et al. | 148/2 |
| 4,970,116 | 11/1990 | Kimura et al. | 430/278 |
| 5,061,591 | 10/1991 | Nakanishi et al. | 430/278 |
| 5,073,475 | 12/1991 | Lauke et al. | 430/278 |

*Primary Examiner*—Jack P. Brammer
*Attorney, Agent, or Firm*—Alfred D. Lobo; David W. Pearce-Smith

[57] ABSTRACT

An essentially flat "arc-grained" surface of a sheet of aluminum alloy is produced with a coarse and non-uniform microstructure which, after it is coated with a durable phosphate-free coating, provides excellent lithoplate. Though such arc-grained microstructure is much coarser than an electrochemically etched surface typically used on lithoplate, the very coarse surface is peculiarly well-adapted to provide durable lithoplate after it is coated with a phosphate-free protective surface. After the coated surface is coated with a photoresist the excellent resolution of prints is maintained over a large number of repeated uses in an off-set printing press. A method of producing lithoplate comprises, controlledly rastering an A-C, or D-C reverse polarity plasma-generating electric arc on an aluminum sheet less than 30 mils thick, kept distortion-free on a mounted surface such as on a cylindrical drum; then coating the arc-grained surface with a hard and durable, inert phosphate-free coating while maintaining a capillary microstructure in the surface adapted to provide a support for a photoresist for use in lithographic printing of adequate resolution.

4 Claims, 6 Drawing Sheets

SINGLE POINT ELECTRDE ARRAY

ROTATING ARC METHOD

ARC-GRAINED LITHOPLATE

BACKGROUND OF THE INVENTION

Aluminum alloy in the form of sheet (also referred to as "foil") is a favored material for making lithographic plate ("lithoplate"), because of the cost effectiveness of foil. But the lithoplate must be properly grained. By "lithoplate" we refer to the aluminum support material before it is coated with a photosensitive "resist". By "cost effectiveness" we refer to the number of prints of acceptable quality which can be made with a single resist-coated lithoplate before it must be replaced. By "graining" we refer to the roughening of a surface of the aluminum sheet. Graining the aluminum sheet is the first step towards providing photoresist-coated sheet with the requisite hydrophobic and hydrophilic characteristics which generate image and non-image areas. Though an aluminum alloy is used, commercial lithoplate of aluminum alloy is referred to as "aluminum" sheet or foil, for brevity, partially because nearly pure aluminum, such as 1050 alloy (99.5% pure) is the preferred material for electrochemically etched lithoplate, and partially because pure aluminum is known to be an impractical material for lithoplate. Rolled aluminum alloy stock is referred to as aluminum "sheet" or "foil" herein.

To provide the hydrophobic and hydrophilic characteristics, a grained aluminum sheet is uniformly coated with a photosensitive "resist" composition which is exposed to actinic radiation beamed onto the resist through an overlay which corresponds to the image to be printed. Areas which are comparatively more soluble following irradiation must be capable of being easily removed from the support, by a developing operation, to generate the hydrophilic non-image areas without leaving a residue. The support which has been laid bare must be strongly hydrophilic during the lithographic printing operation, and be able to exert an adequately repelling effect with respect to the greasy printing ink.

The cost of producing lithoplate includes the cost of producing foil of an appropriately affordable alloy, the foil having a highly uniform microstructure, such as that obtained with electrochemical etching. The conventional wisdom has been: the more uniform the microstructure of controllably grained foil, the better suited the grained foil for use as lithoplate.

In addition to 1050 alloy, other widely used alloys are 3003, 1100 and 5×××, the latter being specifically produced for the production of lithoplate, as disclosed in U.S. Pat. No. 4,902,353 to Rooy et al (class 148/subclass 2) the disclosure of which is incorporated by reference thereto as if fully set forth herein. Though the cost of such alloys themselves is not high relative to the value of the printed material generated with photoresist-coated lithoplate made therefrom, lithoplate is nevertheless deemed costly, and the on-going challenge is to produce more cost-effective lithoplate The cost of lithoplate is ascribed in large part to the cost of graining aluminum sheet so that it is free from imperfections, and will provide adequate resolution of the print to be made, as well as many hundreds, if not thousands of prints, before one must change the lithoplate in a printing press. Such imperfection-free graining, at present, is preferably accomplished by choice of an alloy which is particularly well-adapted to chemical etching which is closely controlled by a bath composition, and the narrowly defined process conditions of its use. Together these result in the highly uniform graining, found by dint of experimentation under actual printing conditions, to be cost effective. Not only is the optimum aluminum alloy expensive, but so also is the necessary close control for chemical etching, and formulating and maintaining a chemical bath. Disposing of exhausted bath compositions, further adds to the expense.

Such considerations militate towards finding a non-chemical solution to the problem of graining an aluminum sheet or foil for lithoplate. But non-chemical graining, that is, mechanical graining is generally accepted as being too non-uniform, not only because it is relatively coarse compared to electrochemical etching, but also because it is difficult to control. The on-going search is for a solution to the problem of providing controllably grained lithoplate without using an electrochemical process.

We have serendipitously found such a solution, except that it produces a highly non-uniform microstructure compared with that produced by electrochemical graining. One skilled in the art of graining foil for use as lithoplate, upon viewing a photomicrograph of the non-uniform microstructure we produce on foil, simply would not consider using it for lithoplate. That is, of course, in the unlikely event that one skilled in the art of making lithoplate chanced upon a thin sheet of phosphate-coated aluminum foil which had been prepared with the intention of resistance welding it to another foil, then inexplicably decided to investigate how it could be modified for use as lithoplate.

In a resistance welding method disclosed in U.S. Pat. No. 4,633,054 (class 219/subclass 118), the disclosure of which is incorporated by reference thereto as if fully set forth herein, we prepared the surface of aluminum sheet for resistance welding. Such preparation involved several procedures, each of which was primarily directed to removing the surface oxide on a workpiece to be welded.

One of these procedures involved "arc cleaning" the surface of the workpiece with an electric arc, the intense heat of which contorted the planar configuration of the sheet. This arc cleaning, also referred to as "cathodic cleaning", resulted in roughening the contorted surface of the sheet in such a manner that the roughened surface was coarse and non-uniform, characterized by a high density of pointed peaks rather than long ridges. Such arc-cleaning is effected under conditions of electric current and traversal rate (the rate at which the arc traverses the sheet), which to a large extent overlap the conditions used for arc-graining; except that, not all arc-cleaned sheet is suitable for being converted to lithoplate, but all uncoated arc-grained sheet is suitable for resistance welding.

All arc-grained aluminum sheet has a characteristic surface morphology, referred to as an "arc-grained morphology", characterized by a profusion of craters peripherally surrounded by delicate petal-like protrusions or projections. The craters range from about $1\mu$ (micron) to about $10\mu$ in diameter, typically in the range from about $2\mu$ to about $5\mu$ in diam. A substantial proportion, from about 30% to about 80%, or more of the protrusions, terminate in peaks or crenelations which, together with the craters, imbue such a surface, when coated with a phosphate-free protective coating with a unique capillary action, namely the ability to have a capillary uptake of both water and printing ink.

These uncoated peaks were mechanically unstable and easily compressed when contacted with the electrode used to make the resistance weld (see '054 patent, col 3, lines 45–50). For the specific purpose of resistance welding, the effectiveness of such arc cleaning of the surface of aluminum stock to be resistance welded, was predicated upon the peaks being so high as to be easily compressible by mechanical pressure exerted by the welding electrode. The peculiarly delicate nature of the uncoated arc-cleaned surface improved the electrical contact between the electrode and the sheet, and resulted in the lowest interface resistance of the treatments evaluated, allowing effective resistance welding. Neither the coarseness nor the random undulations of the contorted surface was of much, if any, import as long as the surface resistance was sufficiently low. The object was to resistance-weld one sheet to another adequately resistance-free aluminum surface. Sheets to be resistance-welded are clamped to one another s that the random undulations in either surface are flattened out. Undulations in foil make it unusable as lithoplate.

Though such an arc-cleaned surface was just right for a workpiece to be resistance welded, an unstable delicate surface, with high peaks and correspondingly deep valleys, was microstructured so differently from the rugged, highly uniform, imperfection-free, fine-grained surface conceptualized as being the ideal lithoplate surface, it was to be expected that the arc-cleaned surface was deemed a most unlikely candidate for consideration in a lithoplate application. For one thing, even after being coated with a durable phosphate-free coating, a delicate surface will be quickly destroyed in normal use on a lithographic printing press. High mechanical stability is a well-established prerequisite for the supporting surface of lithoplate. For another, unless the configuration of anodized peaks and valleys, as well as the density of pointed peaks, were both fortuitously matched to the required capillary uptake of conventional printing inks used in a printing press in the image areas, and of water in the non-image areas, there was no reason seriously to consider using an arc-cleaned aluminum surface for lithoplate, or modifying it to render it usable as lithoplate.

Nevertheless we did consider using an arc-cleaned aluminum sheet, and discovered we could modify the coarsely-grained surface by coating it, successfully enough to produce cost effective lithoplate of remarkably high quality, and obtain a "run life" which exceeded our most optimistic expectations.

SUMMARY OF THE INVENTION

It has been discovered that an essentially flat arc-grained surface of a sheet of aluminum alloy ("aluminum" sheet or foil) can be produced with a coarse and non-uniform microstructure which, after it is coated with a durable phosphate-free coating, provides excellent lithoplate.

It is therefore a general object of this invention to provide non-uniformly arc-grained (relative to the desirable uniform microstructure of an electrochemically etched lithoplate), essentially flat, lithoplate which is peculiarly well-adapted to provide lithoplate. The "grained" supporting surface is photosensitized to provide photoresist-coated lithoplate for off-set printing.

It is also a general object of this invention to provide lithoplate in a two-step process in which the first step comprises "arc graining" a thin, essentially flat aluminum sheet while removing enough heat to maintain its essentially flat configuration by contact with an adequate heat sink, to produce a non-uniform microstructure characterized by roughness ranging from about $0.1\mu$ to about $1.5\mu$ and a profusion of delicate peaks packed closely enough to provide a capillary uptake of water and printing ink in separately identifiable zones; and, in a second step, coating the peaks substantially uniformly with a thin, durable, phosphate-free coating which stabilizes the peaks without adversely affecting the capillary uptake of water and ink by the coated peaks.

It has also been discovered that thin, essentially flat aluminum sheet in the range from about 5 mils but less than about 30 mils thick, can be "rastered" with a plasma-generating electric arc to grain (hence "arc-grain") the surface; such rastering effects localized melting of the surface on a micron level, yet, maintains the essentially flat configuration of the sheet, and produces a non-uniform microstructure which may be coated with a phosphate-free protective coating. This coated microstructure is provided with the required capillary action when the arc-grained sheet is boehmited, nitrided or anodized; when further coated with a photoresist, the result is long-lived, high quality lithoplate.

It is therefore a general object of this invention to provide a method of producing lithoplate by (1) controlledly rastering an A-C, or D-C reverse polarity plasma-generating electric arc on an aluminum sheet less than 30 mils thick, which sheet is removably mounted on a heat sink such as a cylindrical drum, to provide the sheet with an essentially flat, arc-grained surface having a non-uniform but desirable microstructure; then (2) coating the arc-grained surface with a hard and durable, inert phosphate-free coating while maintaining a capillary microstructure in said surface adapted to provide a support for a photoresist for use in lithographic printing of adequate resolution.

It is a specific object of this invention to provide a lithoplate having an arc-grained microstructure which, though coarse and non-uniform relative to an electrochemically etched aluminum surface, when coated with a phosphate-free coating, is unexpectedly well-adapted for use as a support for a resist, because our process avoids the inherent lack of control associated with mechanical graining; and, our process dispenses with the use of chemical baths which do not have to be maintained, and do not have to be disposed of.

It is another specific object of this invention to allow the use of a wide variety of inexpensive, high-strength aluminum alloys, in which the major constituent is aluminum, for use as lithoplate by providing a process for arc-graining a thin essentially flat sheet of such an aluminum alloy and coating the flat sheet with a thin, durable, anodized, nitrided or boehmited coating in the range from about $0.1\mu$ to about $2\mu$ thick, so that it becomes a highly desirable support for a photosensitive layer of organic material.

It is yet another general object of this invention to produce lithoplate comprising, arc-graining aluminum foil with a plasma-generating electric arc traversed in a manner across the surface of the foil so as to provide a non-uniform cratered surface with peripheral petal-like protrusions, generated when the foil is maintained below a temperature at which its essentially flat configuration is converted to an undulating one.

It is still another specific object of this invention to provide a process for using as lithoplate, an essentially flat arc-grained aluminum foil from about 5–25 mils thick, from about 10 cm to about 2 meters wide, and of arbitrary length, having a surface characterized by an arc-grained morphology coated with a phosphate-free protective coating. Because the process is a non-chemical one, it is prey neither to the problems of controlling the quality of chemicals nor to those of disposing of waste chemicals responsibly. Electromechanical arc-graining permits the use of virtually any aluminum alloy ranging from miscellaneous scrap including used beverage containers ("UBC"s) and structural aluminum scrap, to essentially unalloyed aluminum. The latter permits the use of very thin sheet, about 5 mils, which nevertheless provides excellent strength and extended operating life at a saving in the cost of metal.

BRIEF DESCRIPTION OF THE DRAWINGS

The foregoing and additional objects and advantages of the invention will best be understood by reference to the following detailed description, accompanied with schematic illustrations of preferred embodiments of the invention, in which illustrations like reference numerals refer to like elements, and in which.

DETAILED DESCRIPTION OF PREFERRED EMBODIMENTS

Lithoplate for off-set printing is provided at least on one side, typically only on one side, with a radiation-sensitive layer of an organic composition which is light-sensitive. This layer permits the copying or reproduction of a printing image by a photomechanical process. Upon formation of the printing image, the grained supporting material on which the layer is deposited carries the printing image-areas and, simultaneously forms, in the areas which are free from an image, the hydrophilic image-background for the lithographic printing operation.

The grained supporting surface, laid bare in the non-image area, must be so hydrophilic that it exerts a powerful repulsion of greasy printing ink The photosensitive layer must adhere strongly to the grained aluminum support, both before and after exposure. It is therefore essential that the grained support be highly stable, both mechanically, from an abrasion standpoint, as well as chemically, particularly relative to alkaline media.

The First Step—Arc Graining the Aluminum Sheet

In a preferred embodiment, the foregoing are effected by a first step comprising arc-graining a mill-rolled flat aluminum sheet which is about 10–20 mils thick and from 1 ft to about 5 ft wide or even wider. The basic process for arc-graining is similar to that of arc-cleaning disclosed in an article titled "Arc Cleaning Approach for Resistance Welding Aluminum", by Ashton and Rager in Welding Journal, September, 1976. The process was further refined by O'Brien and Titus in an article titled "Arc Cleaning for Joining Aluminum" SAE 830524, March, 1983. We now have adapted and refined the process for the specific, though unrelated, purpose of providing an arc-grained microstructure to support a resist.

Figure 1:
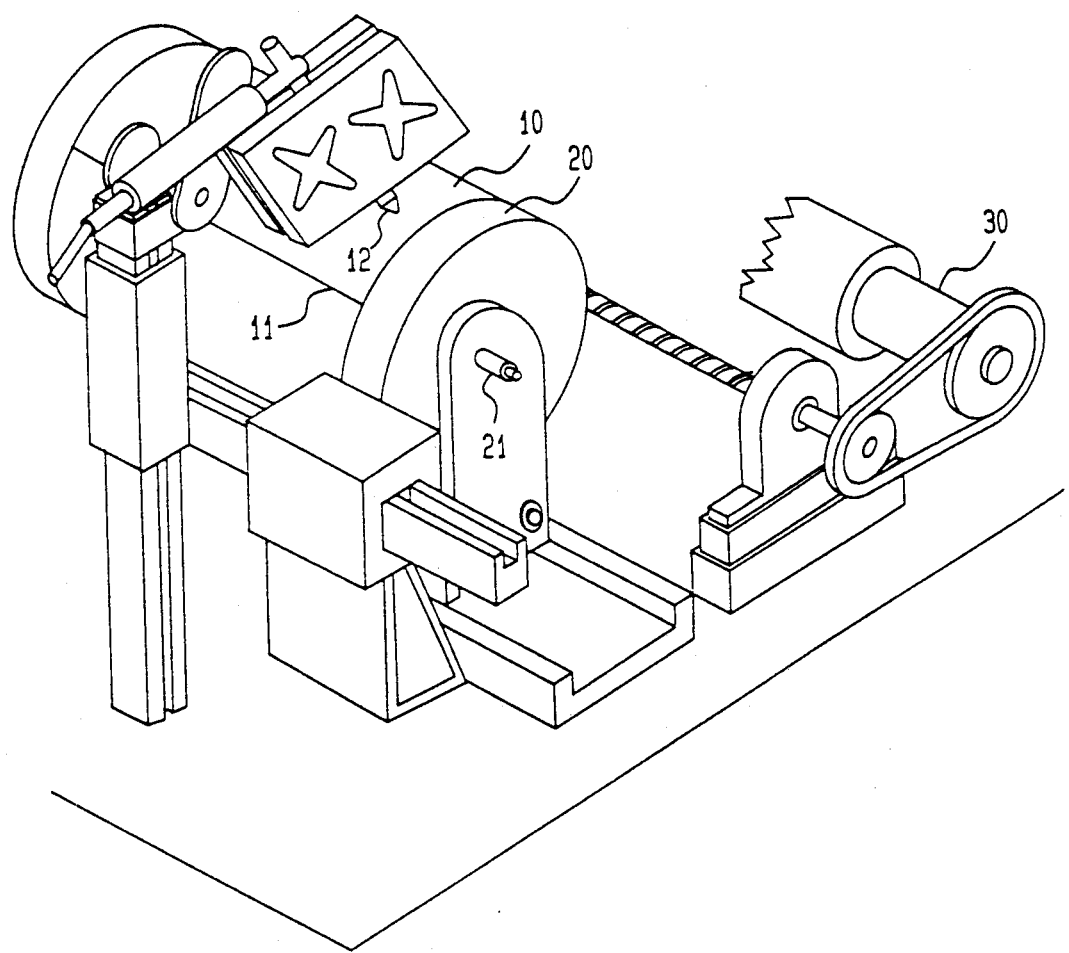
FIG. 1 is a perspective view schematically illustrating an air-cooled steel drum on which a thin, essentially flat aluminum sheet to be arc-grained, is mounted; a plasma-generating electric arc is generated by passing sufficient current through an electrode which is rastered across the drum's surface as it is simultaneously rotated, and translated with a to and fro motion.
Figure 6:
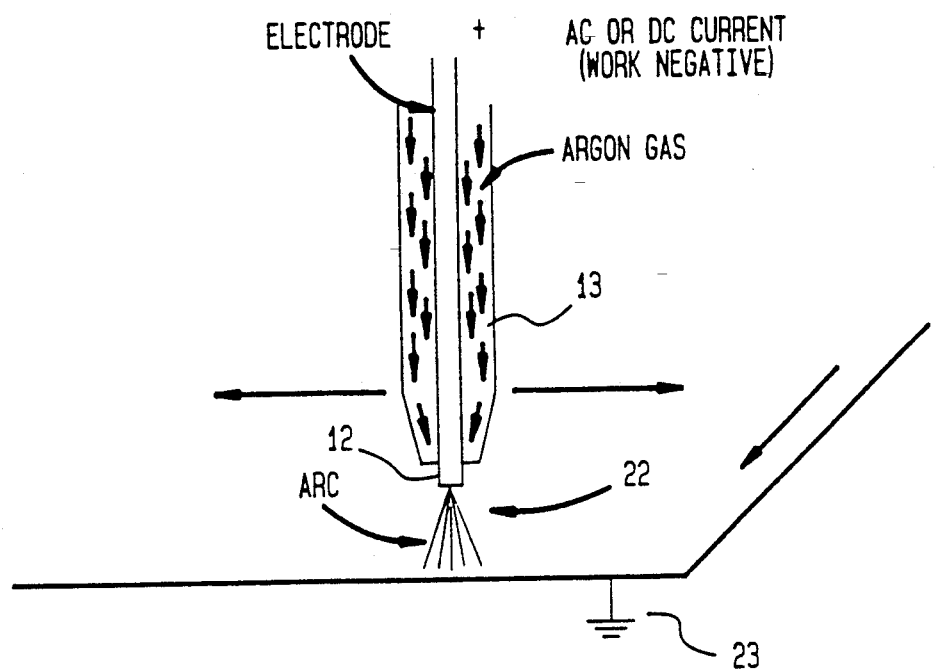
FIG. 6 is a detailed elevational view schematically illustrating the plasma-generating relationship of the electrode and the grounded aluminum sheet to be grained.

Referring to FIGS. 1 and 6, there is shown an aluminum sheet 10 clamped at its longitudinal edges in a horizontal slot 11 so that the sheet lies snugly upon the circumferential surface of a drum 20 functioning as a heat sink means which is rotatably mounted on a shaft 21 driven by a motor 30. The rotating drum is translated laterally, to and fro, to place one side edge, and then the other, of the aluminum sheet in plasma-generating relationship with a electrode means 12, such as a tungsten electrode. This to and fro action is produced by driving the rotating drum along a helically grooved shaft 13 rotatably mounted in bearings 24, the longitudinal axis of the grooved shaft 13 being parallel to the longitudinal axis of the shaft 21 on which the drum 20 rotates. The shaft 21 is mounted in roller bearings in pillow blocks in side supports 14, one on either side of the drum (only one support is visible). The supports 14 are mounted on a carriage 15 (only a portion of the lower portion thereof is visible) for the drum, the carriage being translatable along rails or other slide means 16, to and fro, opposite one end of the helically grooved shaft 13, then the other. The carriage 15 is drivingly engaged with a an internally grooved follower (not shown) which rides back and forth on the helical grooved shaft 13. The grooved shaft 13 is provided with a sprocket 25 keyed to it at one end thereof. The motor 30 is drivingly coupled to another sprocket 26 oppositely disposed from sprocket 25, the two sprockets being drivingly engaged by a drive chain 27. Other means for oscillating the drum, for example a chain drive with terminal microswitches to return the drum to its terminal positions, may also be used.

The electrode 12 is held within a gas feed tube 22 and the flow of gas is controlled by a valve (not shown). The gas feed tube is held in a clamping means 32 and mounted on a support strut 34.

An alternative is to mount the electrode on a carriage which is translatable in a raster motion, back and forth across the aluminum sheet, from one edge to the other. It is not critical whether the electrode is oscillated, or whether the rotating drum is oscillated, as long as the relative motion of the electrode and the mounted aluminum sheet is such as to provide the rastering motion desired.

The sheet is grounded at 28. The speed of rotation of the motor may be varied to vary the microstructure produced by the electrode in a shielding zone 29 (shown in phantom outline) so as to maintain the tip of the electrode 12 in plasma-generating relationship with the surface of the aluminum sheet 10. Meanwhile, an ionizable gas 33 unreactive with either the electrode or the aluminum sheet, is flowed around the electrode (as illustrated with arrows) to shield it in the shielding zone 29 which lies in the vicinity of the tip of the electrode and above the aluminum sheet. This shielding zone may be enclosed by a shielding means (not shown) if desired. The flow of ionizable gas 33 into the shielding zone is under sufficient pressure to ensure that it displaces atmospheric gases and effectively maintains a seal around the electrode.

As received, rolled aluminum sheet has a typical surface roughness of $0.25\mu$ to $0.75\mu$ (microns or micrometers, or 10 to 30 microinches) Ra (average) overlayed with an oxide film the thickness of which may vary widely. This roughness is evidenced by parallel groove created by the contour of the roll in the rolling mill, during the rolling process which forms the sheet. The peaks are relatively low and the valleys between them are correspondingly, not deep.

This sheet 10 was mounted on the drum's surface as shown in FIG. 1, and a GTAW welding torch, fed with helium or argon as the shielding gas, and operated in DC reverse polarity mode with superimposed continuous high frequency, was continuously rastered in a scanning pattern across the surface of the sheet at a linear velocity of about 6 to 19 mm/sec (15 to 45 ins/min). Each scan traverses the width of the sheet along the X-axis, and each subsequent scan traverses the sheet with a next-adjacent pattern which partially overlaps the pattern of the preceding scan. The extent to which the patterns overlap along the X-axis is preferably such that the microstructure generated in the overlapped area is approximately the same as that in the remaining portion of the scanning patterns where there is no overlap. The flow of ionizable gas 13 is in the range from about 12-24 liters/min (25 to 50 ft$^3$/hr). The DC current used is in the range from about 0.005 to about 0.1 kwh/ft$^2$, the amount used being determined by the chosen linear velocity of the raster, thickness of the sheet, and the oxided condition of its surface.

Figure 2:
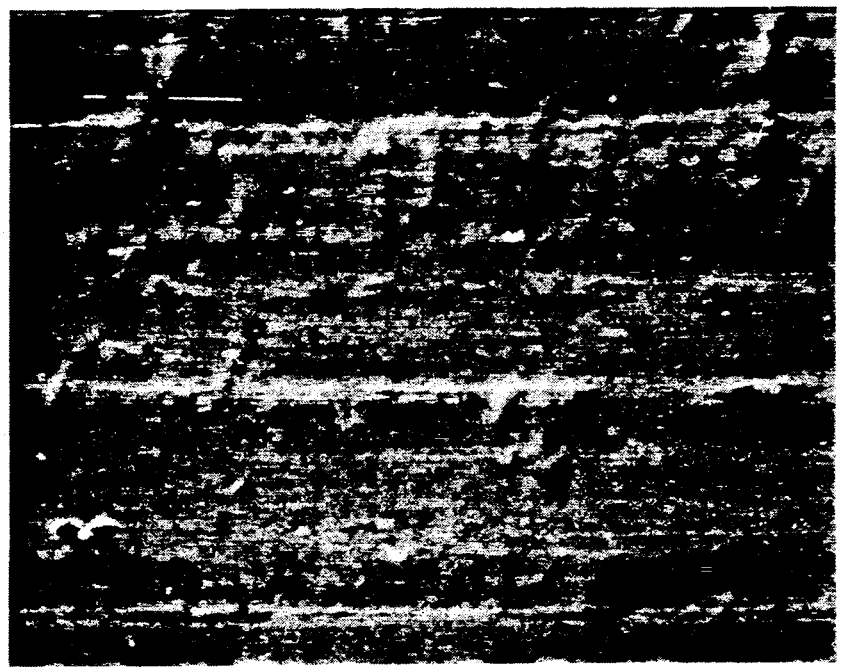
FIG. 2 is a photomicrograph of the surface of a thin (20 mils thick) aluminum sheet of 1050 alloy stock from a commercial shipment of roll stock, magnified 1000 times ("1000×" for brevity) as it is received.
Figure 3:
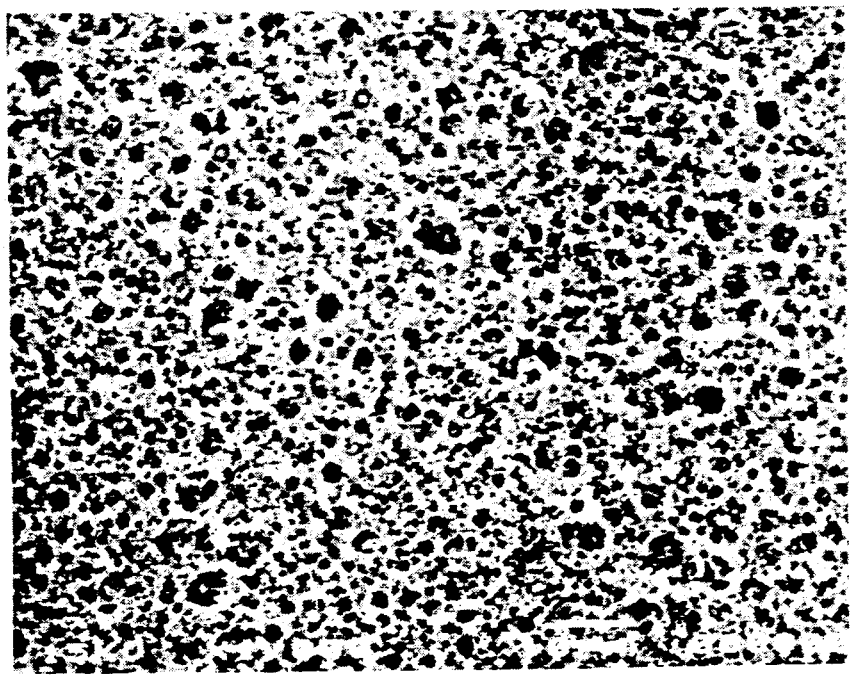
FIG. 3 is a photomicrograph of the surface of another thin sheet of the same 1050 alloy 1000×, showing its highly uniform microstructure after it is electrochemically etched then anodized.

The result is that the surface of the sheet 10 is non-uniformly roughened in the range from about 0.75-1.5 micrometers (30 to 60 microinches). The photomicrograph (FIG. 3) shows the arc-grained surface of a sheet 0.012 ins thick, which surface was generated by the torch operated at 0.01 kwh/ft$^2$, a torch velocity of 10 mm/sec and a gas flow of 12 L/min. Photomicrograph of as-received sheet is see in FIG. 2.

Figure 7:
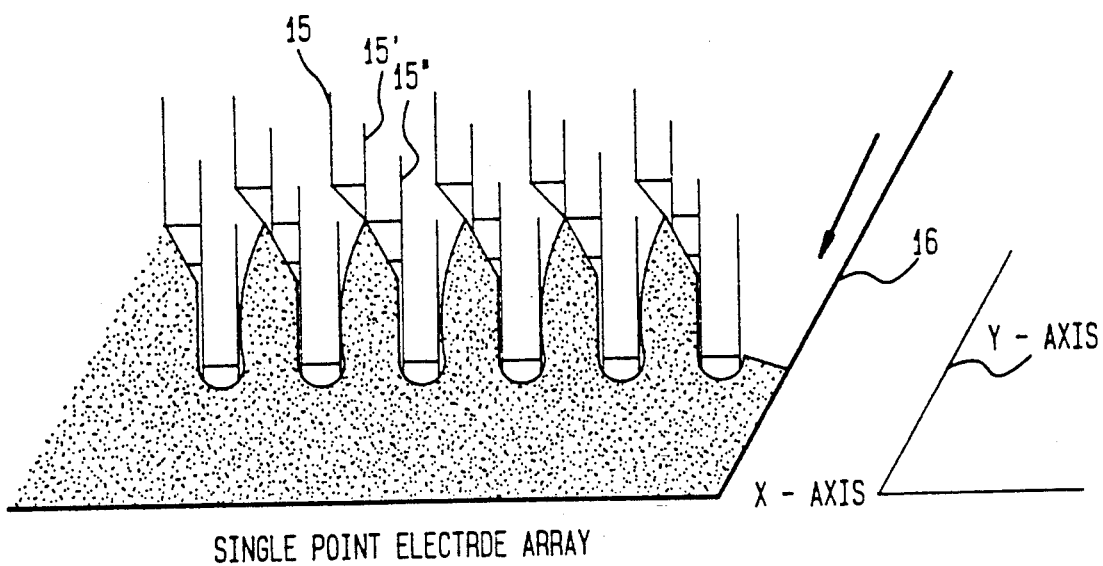
FIG. 7 is a perspective view schematically illustrating multiple stationary electrodes in plural rows, one behind the other relative to the direction of movement of an aluminum sheet to be grained. The sheet is removably mounted on a cooled heat-conductive metal conveyor belt.

In some cases, particularly where the width of the aluminum sheet to be grained is relatively wide, or the speed with which the sheet is to be rastered is unsatisfactorily slow, an electrode configuration illustrated in FIG. 7 may be used. There is illustrated an array of multiple electrodes 35, 35' and 35" in plural rows, each electrode with its own power supply (not shown). The electrodes 35 in the first row are linearly disposed in spaced apart relationship along the X-axis, as are the electrodes 35' and 35" in the second and third rows, respectively. The aluminum sheet 36 is linearly translated beneath the array of electrodes each of which is spaced in plasma-generating relationship with the sheet 36 which is preferably removably clamped or otherwise secured to a laminar, heat conductive conveyor belt (not shown) which conveys the sheet in a direction along the X-axis.

The spacing of the electrodes 35 in the first row along the X-axis is such that the arc-grained pattern generated by each electrode is overlapped along the Y-axis by the patterns generated by the next-adjacent electrodes 35' and 35" in the second and third (X-axis) rows respectively.

Figure 8:
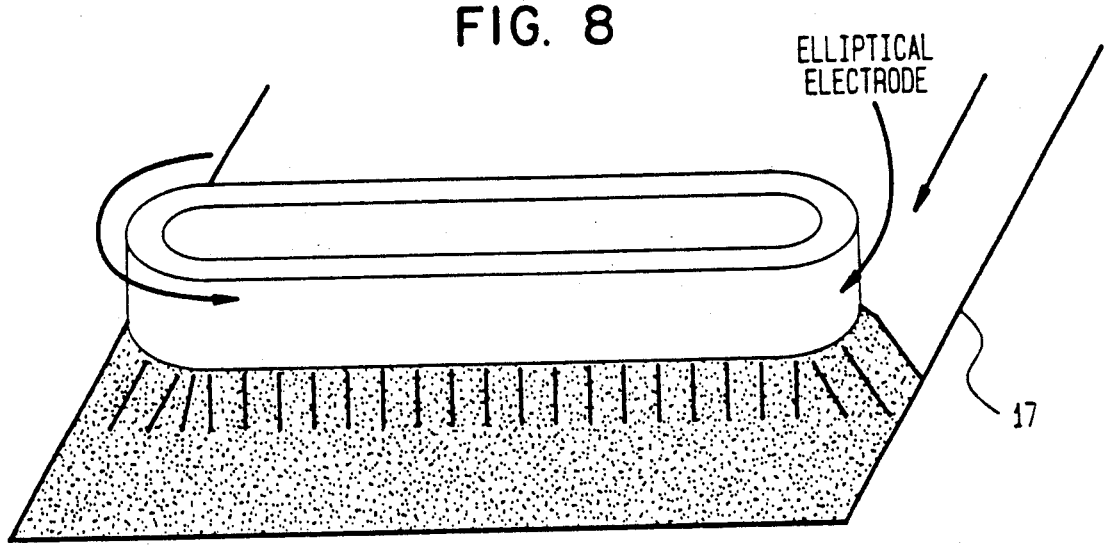
FIG. 8 is a perspective view schematically illustrating an elliptical electrode which generates a magnetically impelled arc (MIA) over a portion of the transverse area of an aluminum sheet to be grained. As before, the sheet is removably mounted on a cooled metal conveyor belt.
Figure 9:
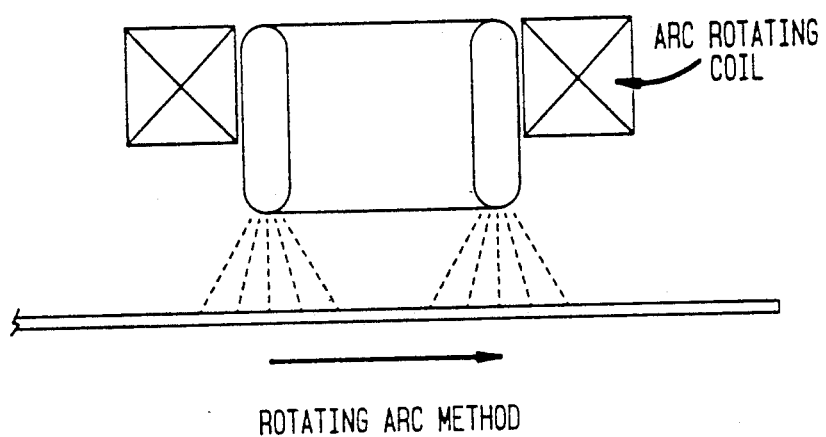
FIG. 9 is a side elevational view of the arc rotating coil shown in FIG. 8, illustrating the spatial relationship of the elliptical electrode and the aluminum sheet to be grained, as the sheet is being laterally translated under the arc.

Referring to FIGS. 8 and 9, there is schematically illustrated a perspective and front elevational views respectively, of another preferred embodiment for arc graining a sheet 40 using an elliptical electrode 41 and magnetically impelled rotating arc. As in the previous embodiment, the sheet 40 is preferably clamped to a heat conductive, flat conveyor belt which is translatable in a direction along the X-axis. A conventional DC welding arc is drawn between the electrode 41 and the face of the sheet 40, and the arc caused to be rotated rapidly by applying a constant magnetic field. The magnetic field for arc rotation is created by two suitably mounted DC coils 42 and 42' in a manner which is well known in the field of magnetically impelled arc welding, first taught in U.S. Pat. No. 2,280,800; or, suitably configured permanent magnets of adequate strength may be used.

The basic technique is applied to the task at hand by using appropriately constructed pneumatic cylinders, electro-pneumatic controls and an automatic adjustment of current to provide the desired arc. The arc current is supplied from a commercial DC welding power supply such as a Quasi-Arc Type MR375 which has a maximum current of 375A with drooping characteristic, controlled by a transductor. The open circuit voltage may be varied in the range from about 10 V to 60 V.

The carriage (not shown) for the elliptical electrode is moved into position, the magnetizing coil currents started, and the arc initiated and stabilized by superimposed high frequency. The position of the carriage is adjusted to a preset gap to maintain the arc continuously while the sheet is being translated beneath. The precise conditions for adjusting the magnetically impelled arc, the rate at which the sheet is translated, and other operating details are arrived at by trial and error such as one skilled in the art would expect to undertake to provide the precisely arc-grained surface desired.

From the foregoing descriptions it will now be evident that aluminum sheet having a large area may be arc-grained essentially continuously, in a single pass, by using at least one, and alternatively, two or three elliptical electrodes, one after the other, to provide the desired arc-grained surface. However, where individual sheets are to be grained, an A—C or D—C reverse polarity plasma-generating electric arc rastered across the surface of a sheet mounted to cover the surface of a drum circumferentially, will be more than adequate.

The Second Step—Coating the Arc-Grained Aluminum Sheet

However obtained, the arc-grained surface consists essentially of a multiplicity of closely spaced, sharp peaks which are to be chemically treated to provide the peaks with a durable coating. The manner in which this is done is not narrowly critical provided the treatment, whether boehmiting, nitriding or anodizing, leaves a capillary surface which provides a sharp demarcation between hydrophilic and hydrophobic areas after the treated sheet is coated with a photoresist and exposed to light.

Though the illustrative embodiment disclosed hereinabove used 1050 alloy in the best mode of the invention, the novel arc-grained lithoplate may be produced from a wide array of aluminum alloys including those which could not previously have been used for lithoplate if electrochemically etched or mechanically grained. Particularly useful aluminum alloys, in addition to 1050 are 1100, 3003, and 5×××including 5005, and 5052.

The arc-grained surface may be boehmited by simply exposing the hot freshly arc-grained surface to a humid atmosphere, or to a fine water spray. A preferred thickness of the boehmite, a crystalline, non-porous gamma-alumina hydrate, is in the range from about $0.06\mu$ to about $3\mu$, preferably from about $0.36\mu$–$1.8\mu$. Because the coating of boehmite is very thin, typically less than $1\mu$ thick, the morphology of the arc-grained surface is preserved, yet the thin coating of boehmite is highly durable.

The freshly arc-grained surface may be also be electrochemically anodized to improve the abrasion and adhesion properties of the surface, as is known in the art, but it is essential that the anodized coating be relatively thick, particularly if the arc-grained surface is relatively coarse. The thicker anodized coating than that provided by boehmiting, provides unexpectedly long-lived lithoplate. The relatively thick layer of oxide preferably in the range from about $1.2\mu$–$3\mu$ provides a density of oxide in the range from about 100–500 mg/sq ft., and any conventional method of anodizing the surface may be employed if it provides an anodized surface having the foregoing specifications.

Conventional electrolytes such as sulfuric acid, orthophosphoric acid, succinic acid, amidosulfonic acid, sulfosuccinic acid, sulfosalicylic acid or mixtures thereof, may be used for anodic oxidation. The direct current sulfuric acid process, in which anodic oxidation is carrier out in an aqueous electrolyte which conventionally contains approximately 230 g of sulfuric acid per liter of solution, for about 1 to 10 min at about 10° C.-20° C., and at a current density of about 0.5 to 2.5 A/sq dm. In this process the sulfuric acid concentration in the aqueous electrolyte solution can also be reduced to about 8% to 10% by weight of sulfuric acid (about 100 g of sulfuric acid per liter), or it can be increased to about 30% by weight (365 g of sulfuric acid per liter), or more.

The "hard anodizing" process is carried out using an aqueous electrolyte containing 166 g of sulfuric per liter at an operating temperature of about 0° C. to 5° C., and at a current density of about 2 to 3 A/sq dm for about 30 to 60 min at a voltage which increases from approximately 25 to 30 V at the beginning of the treatment, to approximately 40 to 100 V toward the end of the treatment. Direct current is preferably used for anodic oxidation but it is also possible to use alternating current, or a combination, for example DC with superimposed AC.

The freshly arc-grained surface may also be conventionally nitrided to provide a hard and durable surface with excellent post-exposure wettability. The density of the nitrided surface is preferably in the range from 5 mg/ft$^2$ to about 30 mg/ft$^2$, and a desirable thickness is in the range from about $10\mu$ to about $500\mu$ (micrometers).

The treated arc-grained aluminum sheet is coated with a radiation sensitive composition, usually by the manufacturer of sensitized printing plates. Any suitable photosensitive layer may be used, which after exposure, followed by development and/or fixing, yields a surface with the desired image which is to be printed. Typically such coated layers contain silver halides, but several others are used, as described in "Light Sensitive Systems" by J. Kosar, John Wiley & Sons, New York 1965. For example, colloid layers containing chromates and dichromates; layers containing unsaturated compounds, in which, upon exposure, the compounds are isomerized, rearranged, cyclized or crosslinked; layers which can be photopolymerized, in which upon being exposed, monomers or prepolymers are polymerized, optionally with the aid of an initiator; layers containing o-diazaquinones, or condensation products of diazonium salts; and still other layers which include electrophotographic layers, that is, those which contain an inorganic or organic photoconductor.

Figure 10:
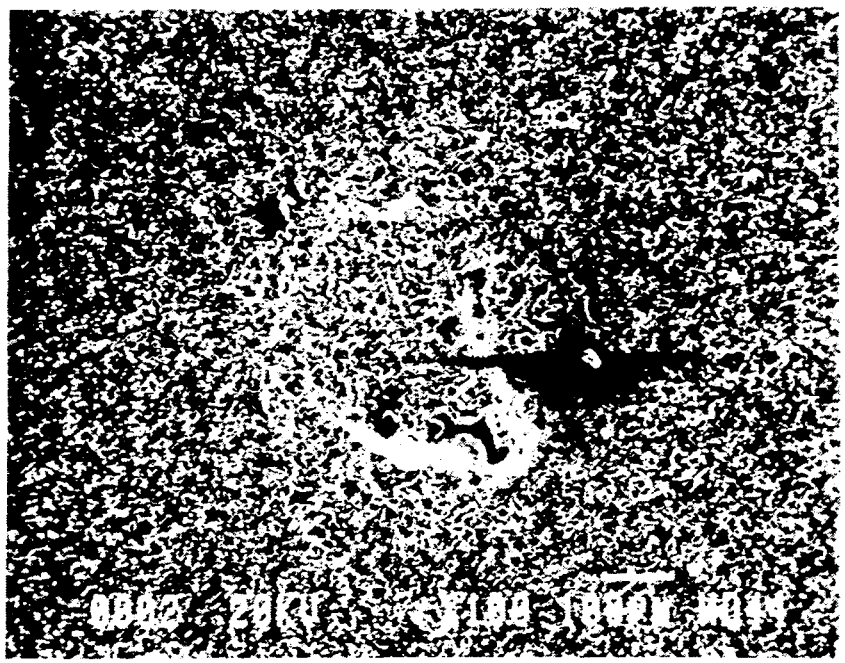
FIG. 10 is a photomicrograph of the surface of another thin sheet of the same 1050 alloy at 100×, which lower magnification shows more clearly how non-uniform its microstructure is after it is arc-cleaned in preparation for resistance welding.
Figure 11:
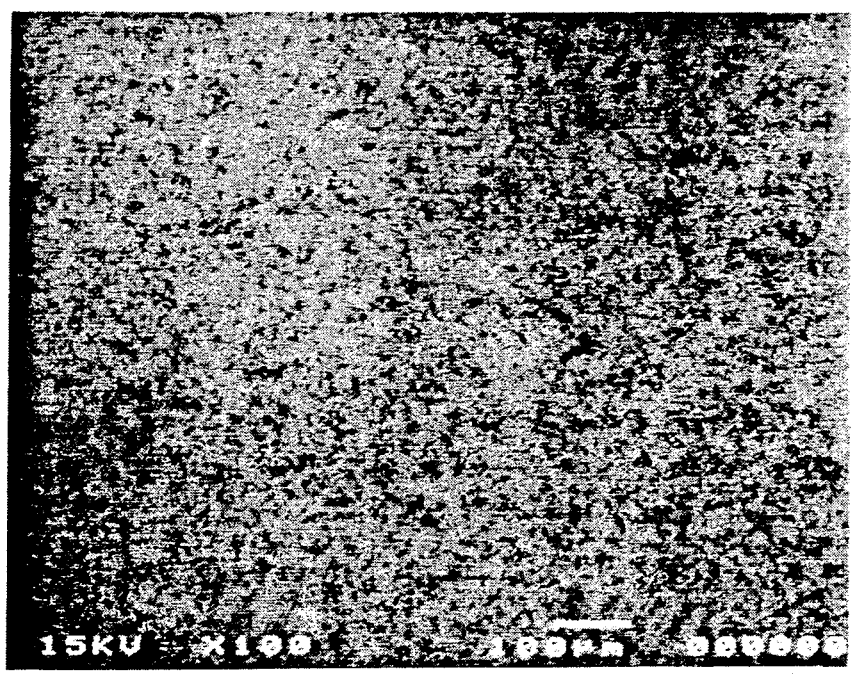
FIG. 11 is a photomicrograph of the surface of another sheet of 1050 alloy arc-grained for lithoplate, at the same lower magnification, namely 100×, to show more clearly that, though also non-uniform, its microstructure is relatively more uniform than the arc-cleaned sheet prepared for resistance welding.

Now referring to FIG. 10 there is shown a photomicrograph of the typical surface of an arc-cleaned sheet under conditions of electric power consumption within the aforestated range for arc-graining the sheet, but at the upper end thereof. A visual comparison indicates that it is substantially more non-uniform than the surface of the sheet of the same alloy which has been arc-grained, shown in FIG. 11. The essential difference is that such arc-cleaned sheet which is eminently suitable for resistance welding is too non-uniform to provide the necessary capillary uptake of both water and printing ink, even after such an arc-cleaned surface is coated with an oxide rather than a phosphate coating.

Figure 4:
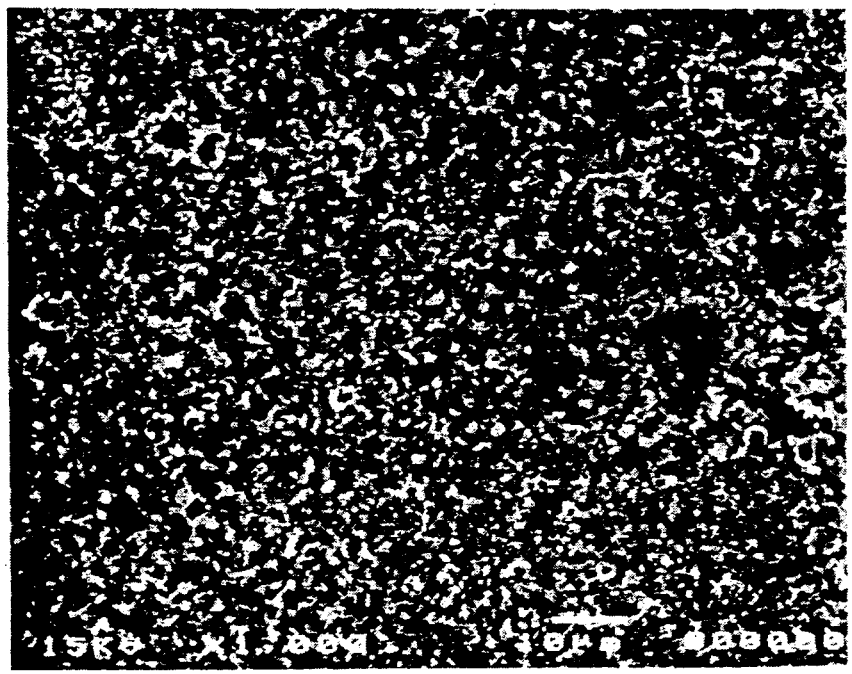
FIG. 4 is a photomicrograph of the surface of another thin sheet of the same 1050 alloy 1000×, showing its non-uniform microstructure after it is arc-grained.
Figure 5:
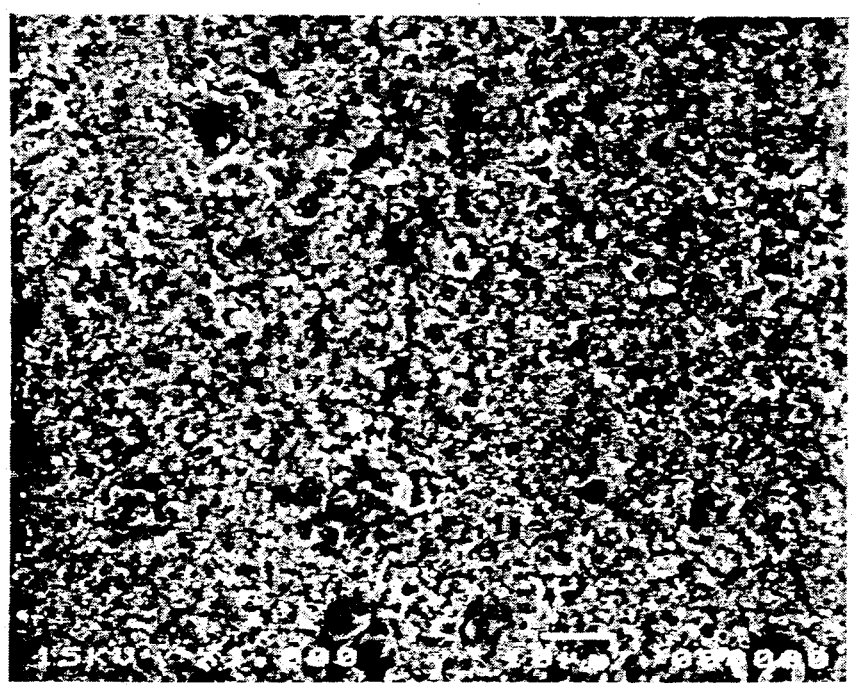
FIG. 5 is a photomicrograph of the surface of the same arc-grained aluminum sheet shown in FIG. 4, after it was conventionally anodized, shown magnified 1000×.

It will be appreciated that the coating provided on the arc-grained sheet is for the dual purpose of protecting the surface from chemical attack during use, and to provide it with desirable physical durability to ensure its longevity in use on a printing press. The thickness of this coating is so small that, in general, it does not make an appreciable visible difference to the roughness of the surface. This is evident in a comparison of the photomicrographs FIGS. 4 and 5. The FIG. 4 shows the freshly arc-grained surface; and FIG. 5 shows an arc-grained surface after it is conventionally anodized.

Having thus provided a general discussion of the problems which have been addressed by the arc-grained lithoplate of this invention, a detailed description of preferred embodiments of the invention, and the unexpected manner in which the problem was solved by modifying a procedure used to prepare foil for an unrelated purpose, it is to be recognized that the scope of this invention not be limited to a slavish duplication of the specific preferred embodiments and illustrations provided, but to the scope of the appended claims.

What is claimed is:

1. In a coated lithoplate of aluminum sheet, the improvement comprising, said lithoplate having an overall thickness in the range from 5 miles to 30 mils and a surface having a non-uniform microstructure having a roughness in the range from $0.1\mu$ to $1.5\mu$[RA, including a profusion of craters having a diameter in the range from $1\mu$ to $10\mu$, peripherally surrounded by petal-like projections with from about 30% to about 80% terminating in peaks packed closely enough to provide a capillary uptake of water and printing ink in separately identifiable zones;

a coating of aluminum oxide or boehmite on said non-uniform microstructure, said aluminum oxide having a thickness in the range from $1.2\mu$ to $3\mu$, and said boehmite having a thickness in the range from $0.6\mu$ to $3\mu$; and, a light-sensitive resist deposited on said coating.

2. The lithoplate of claim 1 wherein said surface is anodized to produce an oxide coating formed in an amount in the range from about 100 to about 500 $mg/ft^2$.

3. The lithoplate of claim 1 wherein said aluminum alloy is selected from the group consisting of 1050, 1100, 3003, and 5×××alloys including 5005 and 5052.

4. The lithoplate of claim 1 wherein said boehmite is a non-porous gamma-alumina hydrate.

* * * * *

UNITED STATES PATENT AND TRADEMARK OFFICE
CERTIFICATE OF CORRECTION

PATENT NO. : 5,187,046

DATED : February 16, 1993

INVENTOR(S) : Edward P. Patrick and A. Victor Pajerski

It is certified that error appears in the above-identified patent and that said Letters Patent is hereby corrected as shown below:

| | |
|---|---|
| Col 3, line 19 | After "another", change "s" to --so--. |
| Col. 5, line 10 | Change "("UBC"s)" to --("UBCs")--. |
| Col. 5, line 56 | After "elliptical", insert --or oval--. |
| Col. 5, line 63 | After "elliptical", insert --or oval--. |
| Col. 6, line 25 | After "ink", insert --.--. |
| Col. 6, line 32 | Delete entire line. |
| Col. 6, line 34 | Delete "a first step comprising". |
| Col. 6, line 47 | Change "Figs" to --Fig.--. |
| Col. 6, line 47 | Delete "and 6". |
| Col. 6, lines 57-58 | Delete "13 rotatably mounted in bearing 24" and insert therefor --as shown--. |
| Col. 6, line 59 | Delete "13". |

UNITED STATES PATENT AND TRADEMARK OFFICE
CERTIFICATE OF CORRECTION

PATENT NO. : 5,187,046
DATED : February 16, 1993
INVENTOR(S) : Edward P. Patrick and A. Victor Pajerski It is certified that error appears in the above-identified patent and that said Letters Patent is hereby corrected as shown below:

| | |
|---|---|
| Col. 6, lines 60-65 | Delete "The shaft 21 is mounted in roller bearings in pillow blocks in side supports 14, one on either side of the drum (only one support is visible). The supports 14 are mounted on a carriage 15 (only a portion of the lower portion thereof is visible) for the drum, the carriage being translatable along rails or other slide means 16, to and fro, opposite one end of the helically grooved shaft 13, then the other. The" and insert therefor --A--. |
| Col. 6, line 68 | Delete "15 is drivingly" and insert therefor --for the drive 20 can be--. |
| Col. 7, line 2 | Delete "13". |
| Col. 7, lines 3-7 | Delete "13 is provided with a sprocket 25 keyed to it at one end thereof. The motor 30 is drivingly coupled to another sprocket 26 oppositely disposed from sprocket 25, the two sprockets being drivingly engaged by a drive chain 27" and insert therefor --can be powered by a hand crank or a reversible motor--. |

UNITED STATES PATENT AND TRADEMARK OFFICE
CERTIFICATE OF CORRECTION

PATENT NO. : 5,187,046

DATED : February 16, 1993

INVENTOR(S) : Edward P. Patrick and A. Victor Pajerski

It is certified that error appears in the above-identified patent and that said Letters Patent is hereby corrected as shown below:

| | |
|---|---|
| Col. 7, line 13 | Delete "The" and insert therefor --Referring to Figure 6, the--. |
| Col. 7, line 13 | Delete "is" and insert therefor --can be--. |
| Col. 7, line 13 | Delete "a" and insert therefor --some--. |
| Col. 7, lines 13-14 | Delete "32 and mounted on a support strut 34" and insert therefor --generally illustrated in Figure 1--. |
| Col. 7, line 15 | Delete "An" and insert therefor --One--. |
| Col. 7, line 23 | Delete "The" (first occurrence) and insert therefor -- In Figure 6, the--. |
| Col. 7, line 23 | Delete "28" and insert therefor --23--. |
| Col. 7, lines 25-26 | Delete "29 (shown in phantom out-line)" and insert therefor --22--. |
| Col. 7, line 32 | Delete "29" and insert therefor --22--. |

UNITED STATES PATENT AND TRADEMARK OFFICE
CERTIFICATE OF CORRECTION

PATENT NO. : 5,187,046

DATED : February 16, 1993

INVENTOR(S) : Edward P. Patrick and A. Victor Pajerski

It is certified that error appears in the above-identified patent and that said Letters Patent is hereby corrected as shown below:

| | |
|---|---|
| Col. 7, line 39 | Delete "As recieved, rolled" and insert therefor --As-rolled--. |
| Col. 7, line 44 | Change "groove" to --grooves--. |
| Col. 7, line 48 | Delete "This" and insert therefor --In one example,--. |
| Col. 7, lines 64-65 | Delete "DC current" and insert therefor --power density--. |
| Col. 8, line 14 | Change "35, 35' and 35''" to --15, 15' and 15''--. |
| Col. 8, line 16 | Change "35" to --15--. |
| Col. 8, line 18 | Change "35' and 35''" to --15' and 15''--. |
| Col. 8, line 19 | Change "36" to --16--. |
| Col. 8, line 22 | Change "36" to --16--. |
| Col. 8, line 26 | Change "35" to --15--. |
| Col. 8, lines 29-30 | Change "35' and 35''" to --15' and 15''--. |

UNITED STATES PATENT AND TRADEMARK OFFICE
CERTIFICATE OF CORRECTION

PATENT NO. : 5,187,046           Page 5 of 6
DATED      : February 16, 1993
INVENTOR(S) : Edward P. Patrick and A. Victor Pajerski It is certified that error appears in the above-identified patent and that said Letters Patent is hereby corrected as shown below:

| | |
|---|---|
| Col. 8, line 35 | Change "40" to --17--. |
| Col. 8, line 35 | After "elliptical", insert --or oval--. |
| Col. 8, line 36 | Delete "rotating" and insert therefor --moving--. |
| Col. 8, line 37 | Change "40" to --17--. |
| Col. 8, line 41 | Change "40" to --17--. |
| Col. 8, lines 41-42 | Delete "rotated rapidly" and insert therefor --rapidly moved around the oval path of the electrode--. |
| Col. 8, line 43 | Delete "rotation" and insert therefor --movement--. |
| Col. 8, lines 43-44 | Delete "two suitably mounted DC coils" and insert therefor --a suitably mounted arc rotating coil appearing in Figure 9 as two cross sections--. |
| Col. 8, line 44 | After " 42' ", insert --. The coil effects movement--. |
| Col. 8, line 46 | Delete "first". |

UNITED STATES PATENT AND TRADEMARK OFFICE
CERTIFICATE OF CORRECTION

PATENT NO. : 5,187,046

DATED : February 16, 1993

INVENTOR(S) : Edward P. Patrick and A. Victor Pajerski

It is certified that error appears in the above-identified patent and that said Letters Patent is hereby corrected as shown below:

| | |
|---|---|
| Col. 8, line 46 | After "2,280,800;", delete "or,". |
| Col. 8, line 48 | After "may", insert --also--. |
| Col. 9, lines 14-15 | Delete both lines in their entirety. |
| Col. 9, line 44 | After "may", delete "be". |
| Col. 9, line 62 | Change "carrier" to --carried--. |
| Col. 11, line 11 | Change "miles" to --mils-- (first occurrence). |
| Col. 11, line 13 | Change "[RA" to -- Ra--. |

Signed and Sealed this

Thirty-first Day of January, 1995

Attest:

BRUCE LEHMAN

*Attesting Officer*     *Commissioner of Patents and Trademarks*